(12) United States Patent
Anderson (10) Patent No.: US 9,233,855 B2
(45) Date of Patent: Jan. 12, 2016

(54) APPARATUS AND METHOD FOR THE TREATMENT OF WATER

(75) Inventor: Raymond Anderson, Caringbah (AU)

(73) Assignee: Aerofloat (Holdings) Pty Ltd, Caringbah (AU)

( * ) Notice: Subject to any disclaimer, the term of this patent is extended or adjusted under 35 U.S.C. 154(b) by 0 days.

(21) Appl. No.: 13/264,288

(22) PCT Filed: Sep. 7, 2010

(86) PCT No.: PCT/AU2010/001156
§ 371 (c)(1),
(2), (4) Date: Oct. 13, 2011

(87) PCT Pub. No.: WO2011/026197
PCT Pub. Date: Mar. 10, 2011

(65) Prior Publication Data
US 2012/0168385 A1    Jul. 5, 2012

(30) Foreign Application Priority Data

Sep. 7, 2009 (AU) ................................ 2009904384

(51) Int. Cl.
| | |
|---|---|
| C02F 1/24 | (2006.01) |
| C02F 1/50 | (2006.01) |
| C02F 1/52 | (2006.01) |
| C02F 1/76 | (2006.01) |
| C02F 9/02 | (2006.01) |
| B03D 1/24 | (2006.01) |
| C02F 9/00 | (2006.01) |
| B03D 1/14 | (2006.01) |
| B03D 1/02 | (2006.01) |
| C02F 1/00 | (2006.01) |
| C02F 103/00 | (2006.01) |

(52) U.S. Cl.
CPC . *C02F 1/24* (2013.01); *B03D 1/028* (2013.01); *B03D 1/1431* (2013.01); *B03D 1/1462* (2013.01); *B03D 1/247* (2013.01); *C02F 9/00* (2013.01); *C02F 1/001* (2013.01); *C02F 1/50* (2013.01); *C02F 1/52* (2013.01); *C02F 1/5236* (2013.01); *C02F 1/76* (2013.01); *C02F 2103/002* (2013.01); *C02F 2103/008* (2013.01); *C02F 2201/001* (2013.01); *C02F 2201/008* (2013.01); *C02F 2209/42* (2013.01)

(58) Field of Classification Search
USPC ............ 210/703, 205, 206, 221.1, 221.2, 257
See application file for complete search history.

(56) References Cited

U.S. PATENT DOCUMENTS

| | | | | |
|---|---|---|---|---|
| 3,547,800 | A | * 12/1970 | Pan Pei Tai | ................... 210/192 |
| 4,193,869 | A |   3/1980 | Brucker et al. | |
| 4,620,980 | A | * 11/1986 | Dumont | ........................ 210/703 |
| 5,055,184 | A | * 10/1991 | Carpenter et al. | ............ 210/109 |

(Continued)

FOREIGN PATENT DOCUMENTS

| | | | |
|---|---|---|---|
| GB | 1444026 | * | 7/1976 |
| GB | 1451201 A | | 9/1976 |

(Continued)

*Primary Examiner* — Thomas M Lithgow
(74) *Attorney, Agent, or Firm* — Lowry Blixseth LLP; Scott M. Lowry (57) ABSTRACT

The present invention relates to an apparatus and method for the treatment of water and, in particular, an apparatus and method which may be applied to fluids such as grey water to be treated prior to discharge. The invention is intended for particular use on marine vessels such as house boats to treat grey water which at present is discharged untreated.

12 Claims, 7 Drawing Sheets

(56) References Cited

U.S. PATENT DOCUMENTS

| | | | |
|---|---|---|---|
| 5,080,780 A * | 1/1992 | Canzoneri et al. | 210/104 |
| 5,156,745 A * | 10/1992 | Cairo et al. | 210/703 |
| 5,549,820 A * | 8/1996 | Bober et al. | 210/199 |
| 5,693,222 A | 12/1997 | Galvan et al. | |
| 5,989,437 A * | 11/1999 | Eriksson et al. | 210/744 |
| 2004/0099607 A1 * | 5/2004 | Leffler et al. | 210/704 |
| 2007/0068826 A1 * | 3/2007 | Morkovsky et al. | 205/742 |
| 2007/0114182 A1 * | 5/2007 | DePoli et al. | 210/703 |

FOREIGN PATENT DOCUMENTS

| | | |
|---|---|---|
| JP | 07-024823 B2 * | 3/1995 |
| JP | 2009119338 A | 6/2009 |
| WO | 2004/035480 A1 | 4/2004 |

* cited by examiner

APPARATUS AND METHOD FOR THE TREATMENT OF WATER

FIELD OF THE INVENTION

The present invention relates to an apparatus and method for the treatment of water and, in particular, an apparatus and method which may be applied to fluids such as grey water to be treated prior to discharge. The invention is intended for particular use on marine vessels such as house boats to treat grey water which at present is discharged untreated.

BACKGROUND OF THE INVENTION

In the field of grey/black water treatment, great efforts are continuously being made to reduce the quantity and concentration of pollutants being discharged into rivers, lakes, surface and ground water supplies, etc. This is evidenced by more and stricter government regulations and requirements relating to grey/black water treatment processes and discharges. The quantities of human wastes requiring treatment are constantly and rapidly increasing. In the field of potable water purification, available surface and ground water sources are rapidly deteriorating due to pollution caused by contaminates generated by a growing population and their careless use of water and improper disposal of waste products.

One area of current concern is the discharge of grey water into the Australian river system. House boats and other marine vessels are commonly used recreational vehicles for families and holiday makers. Currently, grey water is discharged into the river untreated from such vessels, and black water is stored in tanks and pumped to shore-based treatment systems In some states, grey water is also stored and pumped to shore-based treatment systems. The Environmental Protection Agency (EPA) in South Australia has recently introduced new regulations for discharges of grey water from house boats. The new regulations require that untreated grey water can no longer be discharged into the river system.

There are limited water treatment plants known to the present inventor which are suitable in terms of size, weight, power consumption and general functionality for use on such marine vessels, to successfully treat grey water prior to discharge into the river system.

It is therefore an object of the present invention to overcome at least some of the aforementioned problems or to provide the public with a useful alternative.

SUMMARY OF THE INVENTION

In one form of the invention there is proposed a compact dissolved air flotation facility for treating grey water, said facility characterised by:
a grey water collection tank;
a means of flocculating grey water;
a dissolved air flotation (DAF) chamber including a means for directing water entering the chamber to a surface thereof;
a means of pumping grey water out from the grey water collection tank into the dissolved air flotation chamber via the means of flocculating grey water, water entering the DAF chamber having undergone flocculation including suspended matter;
a pressurised dissolver associated with the DAF chamber, said dissolver adapted to saturate water with air;
a means of pumping water out from the DAF chamber and back into the DAF chamber via said pressurised dissolver, whereby air-saturated water degasses upon entry into the DAF chamber and forms bubbles which adhere to said suspended matter causing it to float to the surface to form a layer of float material;
a means of discharging said float material from an upper portion of the DAF chamber; and
a means of discharging water which has undergone treatment from a lower portion of the DAF chamber.

Preferably said means of discharging float material is in the form of an upper discharge line associated with the DAF chamber such that float material is discharged through said upper discharge line when the water level exceeds that of the upper discharge line.

In preference said means of discharging treated water is in the form of a lower discharge line having a valve operable between a closed position to prevent flow through said lower discharge line and an open position to allow flow through.

Preferably said valve is adapted to be closed for a predetermined period of time during a treatment cycle to thereby cause said water level in the DAF chamber to rise and for said float material to be discharged through the upper discharge line.

In preference said facility further includes a chlorination chamber associated with said DAF chamber such that treated water that is discharged through the lower discharge line passes through said chlorination chamber.

Preferably said chlorination chamber is located downstream of said valve.

In preference an inlet of said chlorination chamber defines the height of said water level in the DAF chamber, said chlorination inlet being disposed below the DAF chamber upper discharge pipe.

Preferably said DAF chamber includes a submerged contact chamber for facilitating contact between the air-saturated water from the dissolver and the suspended matter.

Preferably said contact chamber includes a base, a side wall, an inlet for said air-saturated water and an inlet for flocculated grey water which includes suspended matter, said base and side walls being configured to concentrate interaction between the air-saturated water and suspended matter inside the DAF chamber.

In preference said means of flocculating grey water is in the form of a flocculation chamber including:
an inlet pipe for said water;
a means of introducing coagulant to said water flowing through said inlet pipe prior to entry into said chamber;
an outlet pipe for said water; and
a length of pipe between said inlet and outlet pipes including a series of adjacent, upward and downward extensions inside said chamber in a long intestine-type arrangement, to thereby facilitate flocculation of said water prior to reaching the outlet pipe.

Alternatively said means of flocculating grey water is in the form of a coil through which water is adapted to pass between the collection tank and the DAF chamber, said coil including a means of introducing coagulant to said water flowing through the coil.

In a further form of the invention there is proposed a dissolved air flotation chamber for a water treatment system, said dissolved air flotation chamber including:
a body of water including suspended matter, said body of water including a top surface;
a contact chamber submerged inside said body of water such that an opening thereof is submerged adjacent the top surface;
a first inlet into said contact chamber for supplying said body of water;
a second inlet into said contact chamber for supplying air-saturated water which degasses upon entry into the contact chamber and forms bubbles which adhere to said suspended matter causing it to float to the top surface to form a layer of float material; and an outlet adjacent the bottom of said dissolved air flotation chamber for discharging treated water.

In preference said dissolved air flotation chamber further includes a discharge pipe above the top surface of the body of water.

Preferably said dissolved air flotation chamber includes a valve at the outlet adapted to be closed for a predetermined amount of time to enable the water level to rise and said float material to be discharged through said discharge pipe.

In a yet further form of the invention there is proposed a dissolved air flotation system including:

a dissolved air flotation chamber including an internal, submerged contact chamber for directing water entering the contact chamber to the surface of the dissolved air flotation chamber, said dissolved air flotation chamber including a discharge pipe;

a first inlet extending into the contact chamber for supplying the dissolved air flotation chamber with water to be treated, said water to be treated including suspended matter;

a second inlet extending into the contact chamber;

a first outlet extending out from the bottom of the dissolved air flotation chamber;

a second outlet extending out from the bottom of the dissolved air flotation chamber, said second outlet being a clean water discharge outlet;

a pressurised dissolver for saturating water with air;

a pump adapted to pump water from the first outlet of said dissolved air flotation chamber and into the second inlet of the contact chamber via said dissolver and orifice plate assembly, whereby air-saturated water degasses upon entry into the contact chamber and forms bubbles which adhere to said suspended matter causing it to float to the surface of the dissolved air flotation chamber to form a layer of float material; and a valve associated with the second outlet adapted to be closed for a predetermined amount of time to enable the water level in said dissolved air flotation chamber to rise and said float material to be thereby discharged through said discharge pipe.

In a still further form of the invention there is proposed a dissolved air flotation system including:

a dissolved air flotation chamber including an internal, submerged contact chamber for directing water entering the contact chamber to the surface of the dissolved air flotation chamber, said dissolved air flotation chamber including a discharge pipe;

a first inlet extending into the contact chamber for supplying the dissolved air flotation chamber with water to be treated, said water to be treated including suspended matter; a second inlet extending into the contact chamber;

a first outlet extending out from the bottom of the dissolved air flotation chamber;

a second outlet extending out from the bottom of the dissolved air flotation chamber, said second outlet being a clean water discharge outlet;

a pressurised dissolver for saturating water with air, said dissolver including an inlet nozzle disposed in a headspace of said dissolver;

an orifice plate assembly associated with an outlet of said dissolver, said orifice plate assembly adapted to create a back pressure in said dissolver;

a pump adapted to pump water from the first outlet of said dissolved air flotation chamber and into the second inlet of the contact chamber via said dissolver and orifice plate assembly, whereby air-saturated water degasses upon entry into the contact chamber and forms bubbles which adhere to said suspended matter causing it to float to the surface of the dissolved air flotation chamber to form a layer of float material;

a valve associated with the second outlet adapted to be closed for a predetermined amount of time to enable the water level in said dissolved air flotation chamber to rise and said float material to be thereby discharged through said discharge pipe, before opening again; and whereby the change in pressure which occurs in the dissolver headspace causes said water level in the dissolved air flotation chamber to rise a second time to thereby displace a further amount of float material.

In a still further form of the invention there is proposed a grey water treatment system including:

a grey water collection tank;

a flocculation chamber;

a dissolved air flotation chamber including an internal, submerged contact chamber for directing water entering the contact chamber to the surface of the dissolved air flotation chamber, said dissolved air flotation chamber including a discharge pipe;

a pump adapted to pump grey water out from the grey water collection tank into the contact chamber via the flocculation chamber, water entering the contact chamber from the flocculation chamber including suspended matter;

a pressurised dissolver for saturating water with air;

an orifice plate assembly associated with an outlet of said dissolver, said orifice plate assembly adapted to create a back pressure in said dissolver;

a pump adapted to pump water out from the dissolved air flotation chamber and into the contact chamber via said dissolver and orifice plate assembly, whereby air-saturated water degasses upon entry into the contact chamber and forms bubbles which adhere to said suspended matter causing it to float to the surface of the dissolved air flotation chamber to form a layer of float material;

a chlorination chamber configured such that water inside said dissolved air flotation chamber flows through a discharge line to an inlet of said chlorination chamber, whereby the height of said inlet defines a water level in said dissolved air flotation chamber, said water level disposed below the discharge pipe; and a valve in said discharge line adapted to prevent flow of water from the dissolved air flotation chamber to the chlorination chamber for a predetermined amount of time to thereby cause said water level to rise and said float material to be discharged through said discharge pipe.

In preference said system is intended to be retro-fitted to a houseboat so that grey water from kitchen sinks, laundries and the like is fed to said grey water collection tank.

In a still further form of the invention there is proposed a treatment cycle for grey water, said cycle comprising the steps of:

feeding a dissolved air flotation chamber with water to be treated, said water including suspended matter;

feeding said chamber with air-saturated water which degasses upon entry into the chamber and forms bubbles which adhere to the suspended matter and cause it to float to a top surface of water in the chamber, thereby forming a layer of float material;

providing a float material discharge pipe at the top of the chamber above the top surface of water;

providing a treated water discharge outlet at the bottom of the chamber;

providing a valve at said discharge outlet adapted to be shut at the start of a cycle for a predetermined period of time to thereby cause the water level in the dissolved air flotation chamber to rise and the float material to be discharged through said discharge pipe.

In preference said valve is an automatic valve including a delay timer which enables the valve to open once a predetermined amount of float material has been discharged.

BRIEF DESCRIPTION OF THE FIGURES

The accompanying drawings, which are incorporated in and constitute a part of this specification, illustrate several implementations of the invention and, together with the description, serve to explain the advantages and principles of the invention. In the drawings.

DESCRIPTION OF THE PREFERRED EMBODIMENTS

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the embodiments and the following description to refer to the same and like parts.

The term "grey water" is used in this description and in the claims to describe water which is not human sewage but results from use by humans such as in washing and the like. The term "grey water" can encompass effluent from kitchen sinks, laundries, showers and the like. The term "black water" is used in this description and claims to refer to water in which human sewage is a significant component. Black water normally results from effluent from toilets and the like.

Figure 1:
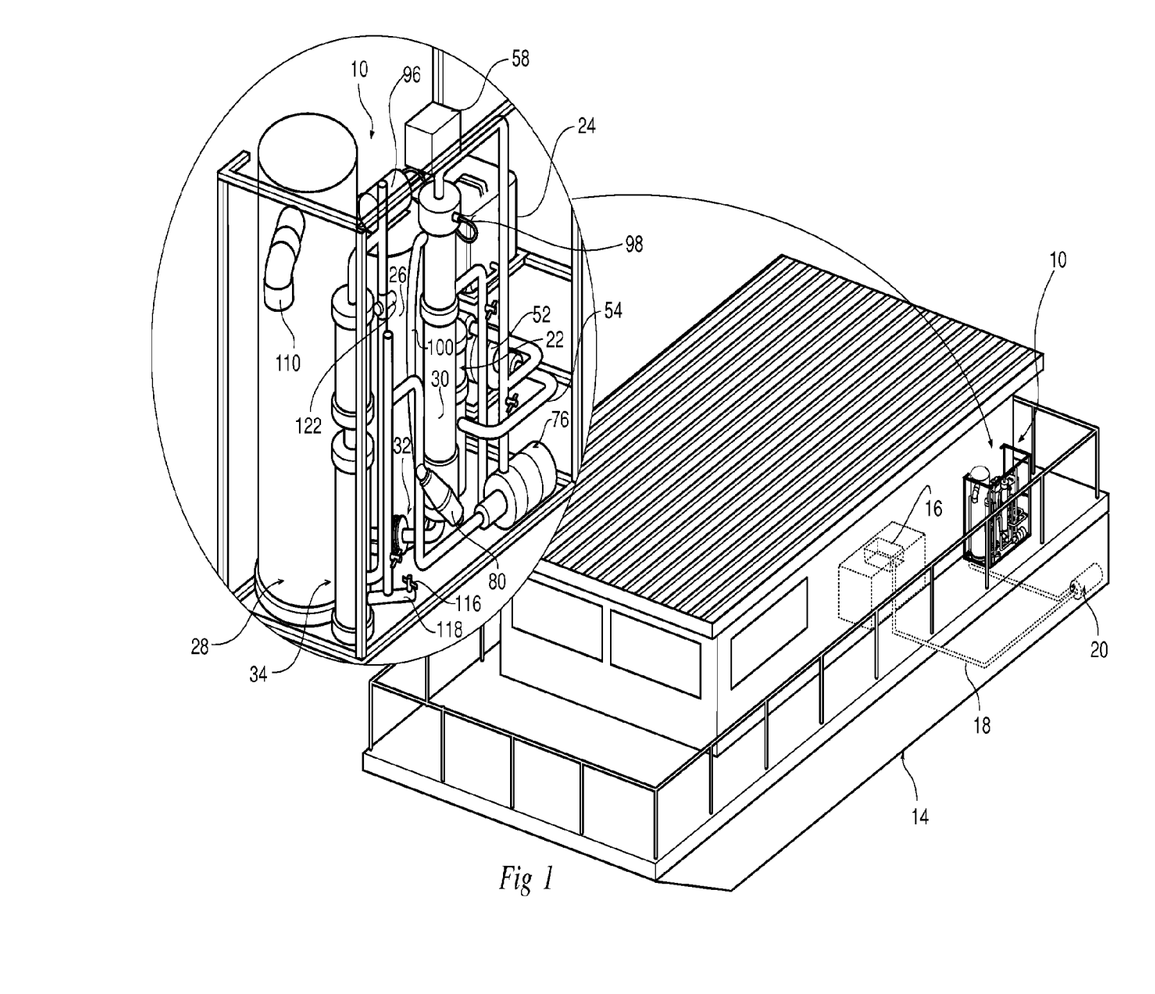
FIG. 1 illustrates a perspective view of a house boat including an enlarged view of a water treatment system embodying the present invention.

The present invention relates to a plant or system 10 for treating fluids such as grey water 12 and which works on the principles of dissolved air flotation (DAF). As shown in FIG. 1, the invention is intended for particular use on house boats 14 so that rather than grey water 12 from sinks 16 and the like being discharged into the river, it is transported through pipes 18 to a grey water collection tank 20 and treated using the apparatus 10 of the present invention prior to discharge into the river.

Thus, the system 10 is adapted for use in environments having relatively reduced space for collection of grey water. Such vehicles may include recreation vehicles, water vessels and the like. It should be understood, however, that while the invention is discussed in association with its application to a house boat, the system is equally applicable to use in land based mobile vehicles such as recreational vehicles and the like, and also to fixed installations such as in buildings not having connection access to sewage treatment systems such as rural properties and the like. It could also have application for treating grey water even if sewerage is available, as the treated grey water can be reused for irrigation and other household uses.

Figure 2:
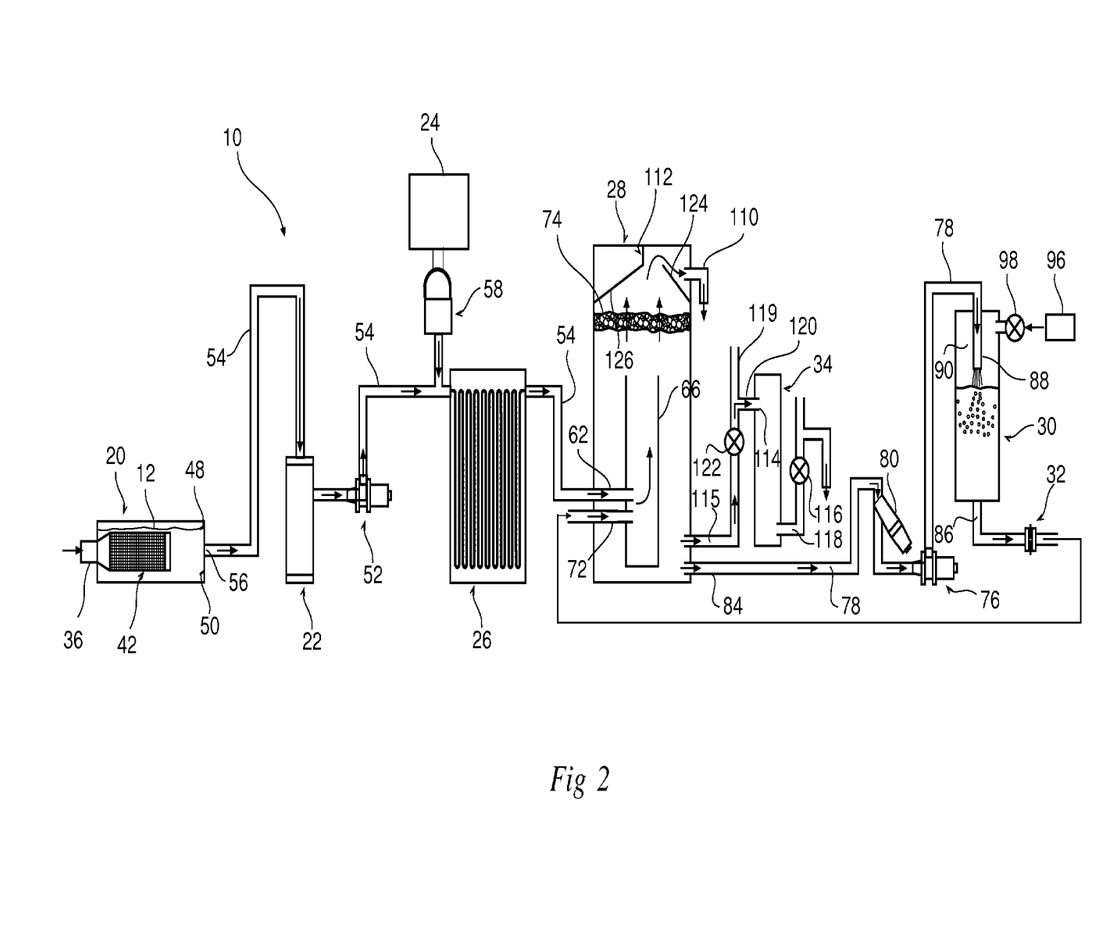
FIG. 2 illustrates schematically the water treatment system of FIG. 1.

A simplified schematic illustration of the system 10 is shown in FIG. 2. The principal components include the grey water collection tank 20 mentioned earlier, a priming pot 22, a coagulating holding tank 24, a flocculation chamber 26, a DAF chamber 28, a dissolver 30 and associated orifice plate assembly 32, and chlorinator or chlorination chamber 34. Although not shown, the boat 12 also includes a black water collection tank.

Grey water is collected by suitable piping 18 from all sinks, showers, washing facilities and the like and directed to the grey water inlet 36 of the grey water collection tank 20. This tank is shown in more detail in FIG. 3. The tank includes a cylindrical outer body 38, an elevated semi-circular perforated tray 40, and a screen 42 supported on the tray 40. The screen 42 is a mesh filtering screen and is positioned such that all water flowing into the tank 20 flows through the screen. The inlet 36 to the collection tank 20 feeds grey water into the screen 42 and its purpose is to filter out any larger solid particles present in the grey water so as to prevent blockages downstream. Thus, on the outside of the screen 42 is grey water which has undergone a first filtration.

Figure 3:
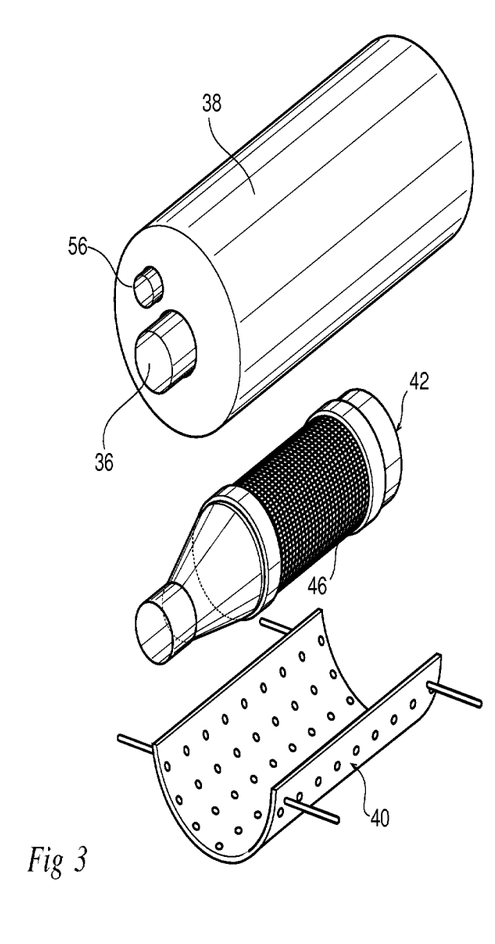
FIG. 3 illustrates an internal perspective and exploded external perspective view of a grey water holding tank forming part of the water treatment system of FIG. 1.

Although not shown, the outer body 38 includes an opening at the top so that the screen 42 may be easily removed and cleaned, or replaced with a new screen. It is to be further understood that the screen 42 need not necessarily be a mesh filter screen but any other suitable material capable of performing the same function. For example, a perforated sack material or fabric could equally well be used.

In an alternate embodiment, a perforated cloth laundry bag (or bra bag) is used and is made to hang vertically down off the incoming drainage pipe as a screening facility rather than the screen shown and described.

The grey water holding tank 20 also includes a high level sensor 48 and low level sensor 50, the purpose of which will be described in more detail below.

A positive displacement pump 52 is used to create a grey water suction line 54 between the outlet 56 of the grey water collection tank 20 and the DAF chamber 28, via the flocculation chamber 26. The purpose of the priming pot 22 is to prime the pump 52 in the event of a negative suction condition, avoiding the need for a foot valve and/or frequent priming of the pump.

Between the pump 52 and the flocculation chamber 26, a suitable coagulant such as aluminium sulphate is injected into the suction line 54 using preferably a peristaltic metering pump 58 to flocculate suspended matter in the screened grey water. The skilled addressee would know that such pumps 58 are commonly used for dosing detergent directly into the basin of a dishwashing or laundry machine. The same principle applies here in that the pump is used to dose grey water travelling through suction line 54 with aluminium sulphate at a constant flow rate prior to entering the flocculation chamber 26.

Figures 4A, 4B:
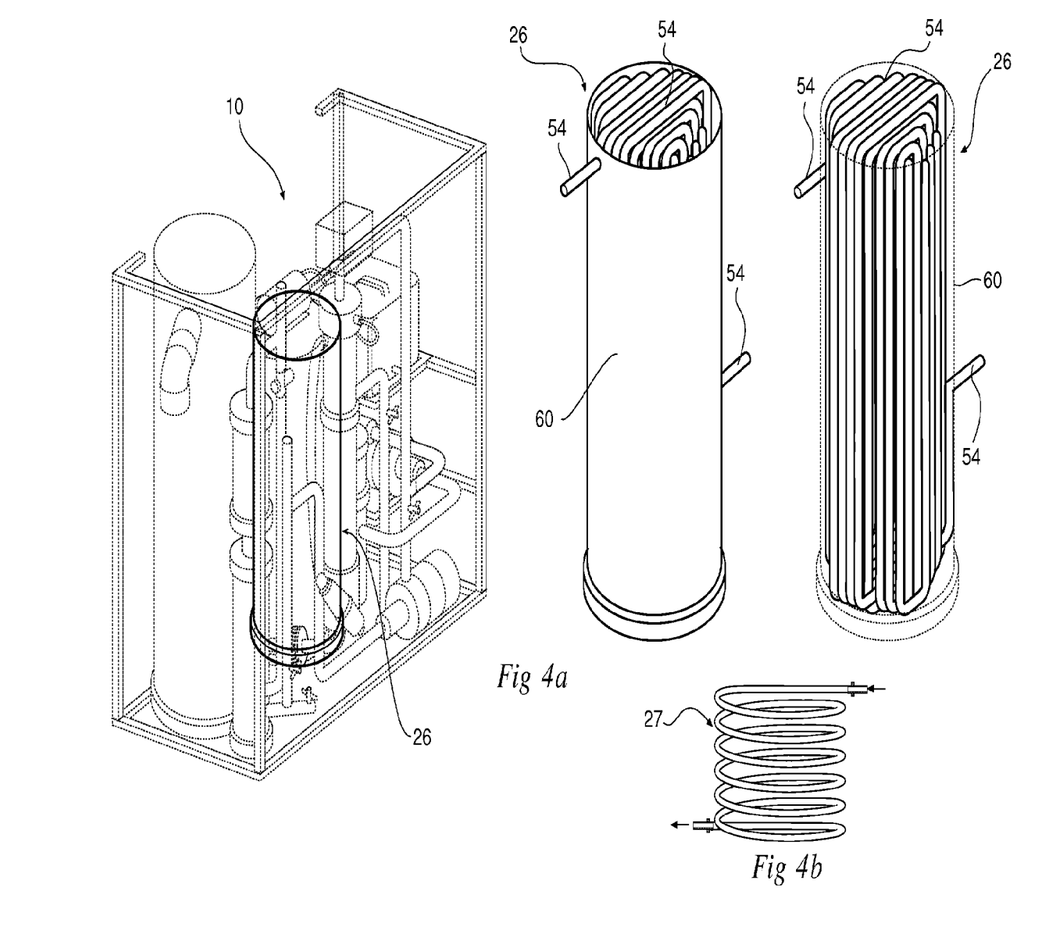
FIG. 4a illustrates internal and external perspective views of a flocculation chamber forming part of the water treatment system of FIG. 1.
FIG. 4b illustrates a perspective view of a flocculation chamber in accordance with a second and preferred embodiment of the invention.

FIG. 4a illustrates the flocculation chamber 26 in more detail. In order for flocculation to take place, the coagulant needs to be in contact with the grey water for a predetermined amount of time (in the embodiment shown, some 15-60 seconds). Thus, the suction line 54 inside the chamber is configured to create as long a contact time as possible by extending in a long intestine-type manner up and down the chamber. Each upward and downward extension of the pipe is disposed in close proximity to one another, allowing for all of the pipework to fit inside the diameter of the chamber's outer cylindrical body 60. In a preferred embodiment, the flocculation chamber is in a coil-type configuration 27 as shown in FIG. 4b. The present invention is not intended to be limited to any one flocculation chamber configuration, the only essential factor being that it is quite compact in size for use on a house boat or similar vessel.

Figure 5A:
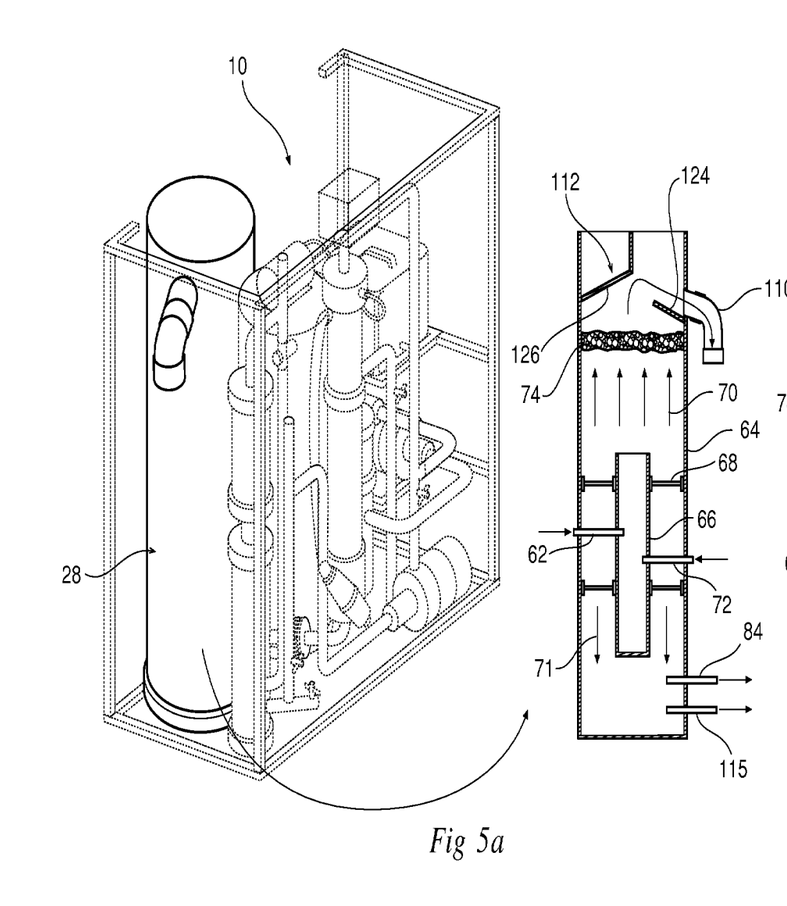
FIG. 5a illustrates a cross-sectional view of a circular cross section dissolved air flotation chamber and associated contact chamber which form part of the water treatment system of FIG. 1.

The DAF chamber 28 is shown more clearly in FIG. 5a and includes an inlet 62 extending through the chamber's outer cylindrical body 64, and into an internal cylindrical contact chamber 66 supported centrally inside the outer body 64. The chamber 66 is closed at the bottom but includes an open top. In the embodiment shown, mounting pins 68 are used to maintain the chamber 66 in an elevated state inside chamber 28. Screened and flocculated grey water (influent) from the flocculation chamber 26 flows through inlet 62 and enters the contact chamber 66 where it then rises up towards the surface of the DAF chamber 28 in the direction of arrows 70. In the meantime, clean water flows to the bottom of the chamber in the direction of arrows 71.

The dissolved air flotation method of the present invention involves taking treated effluent from the DAF chamber 28, saturating the effluent with air, and then introducing the air-saturated effluent back into the DAF chamber 28, in this case through a second inlet 72 into the contact chamber 66. When the pressurised dissolved air enters the chamber, it degasses, resulting in the formation of tiny bubbles (not shown) in the contact chamber 66. The bubbles adhere to suspended matter in the influent feed, causing the suspended matter to float to the top of the DAF chamber 28 forming a layer of scum or froth 74. This process will now be described in more detail.

A second positive displacement pump 76 is used to create a further suction line 78 between the outlet 76 at the bottom of the DAF chamber 28 and the inlet 72 back into the contact chamber 66, via the dissolver 30 and orifice plate assembly 32. Prior to entering pump 76, the water is subjected to further filtration using filtration device 80. The purpose of further filtering at this stage of the process is to ensure that any solids which may be present in the treated effluent do not cause blockages in the orifice plate assembly 32 downstream.

Figure 6:
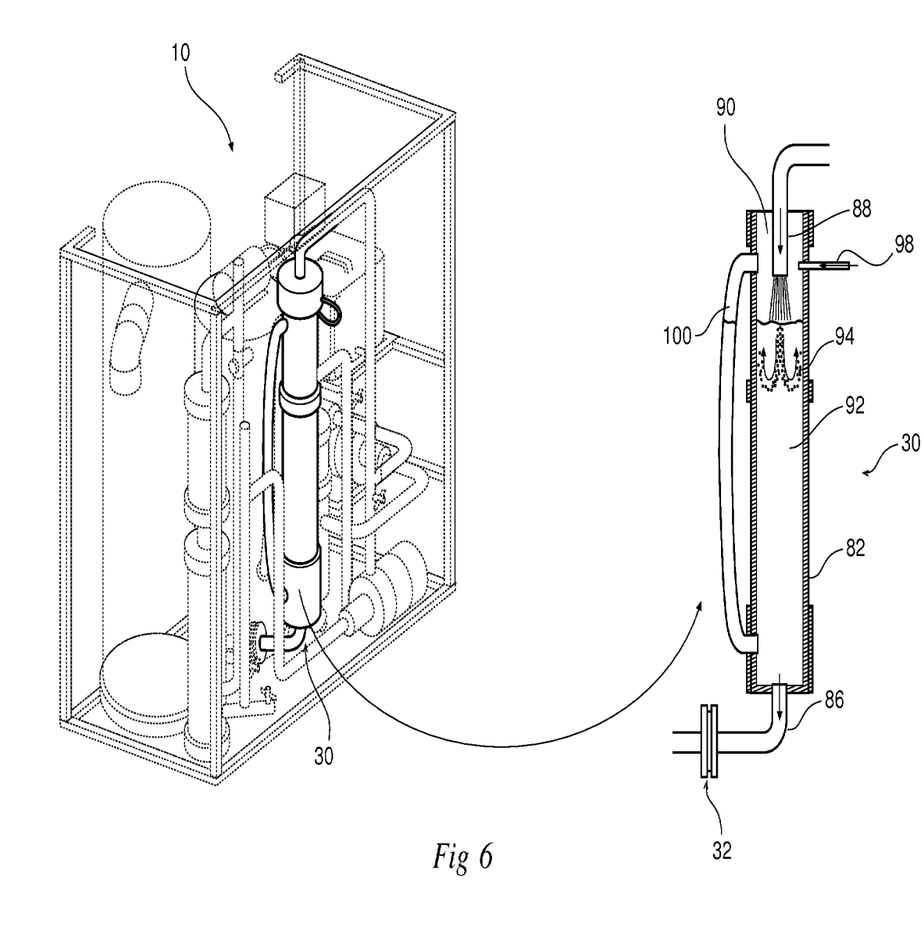
FIG. 6 illustrates a cross-sectional view of a dissolver and an associated back pressure orifice plate forming part of the water treatment system of FIG. 1.

FIG. 6 illustrates the dissolver 30 in more detail. The dissolver 30 is a sealed, pressurised container 82 into which treated effluent from the bottom outlet 84 of the DAF chamber is pumped. The container maintains pressure through use of an orifice plate assembly 32 on the outlet 86 of the dissolver, which will be described in more detail below. Water enters the container through inlet nozzle 88, and because the water level is below the nozzle, compressed air in the headspace 90 is entrained around the water as it exits the nozzle 88. This results in coarse air bubbles or a "bubble plume" 92 being forced down the body of water, thereby saturating it with air. Free undissolved portions of the air 94 rise by their own buoyancy towards and up along the side walls of the dissolver. Air-saturated water from the dissolver is then fed back into the contact chamber 66 of the DAF chamber 28 via orifice plate assembly 32.

The skilled addressee would realise that because the dissolver 30 is pressurised, air which is taken from the headspace 90 and dissolved in the water needs to be replaced to enable the process to repeat itself in further treatment cycles. Hence, an air compressor 96 is used to compress air and, through use of a control valve 98, inject a sufficient quantity of air into the headspace of the dissolver at appropriate intervals. The dissolver further includes a transparent hose 100 extending between a top and bottom end of the container 82. This is to provide a user with a visual indication as to the water level inside the dissolver at any one time, and hence whether too much or an insufficient amount of air is being added relative to the amount being dissolved.

It is to be understood that other means of controlling the amount of injected air could be used. Whilst not shown specifically in the drawings, a preferred embodiment would be to use a high level switch (not shown) located off the main dissolver tube. As the air dissolved, the water level in the dissolver rises. When the level reaches the top water level, the level switch is triggered and this opens the air valve 98 for a preset time to allow a set injection of air into the dissolver headspace, and hence the water level drops. The process continues and as the air dissolves, the water level rises again until it reaches the switch where the process then repeats.

Figure 7:
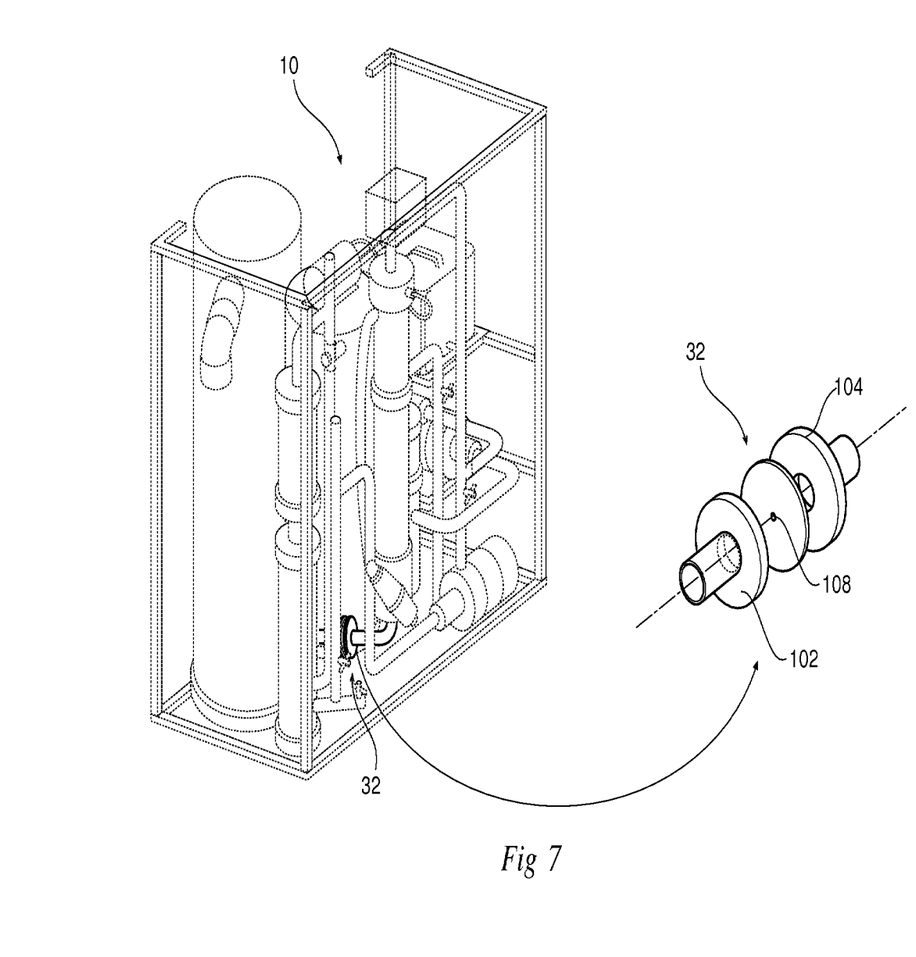
FIG. 7 illustrates an exploded perspective view of the orifice plate of FIG. 6.

As mentioned, the orifice plate assembly 32 in the return line between the dissolver 30 and the DAF chamber 28 is what maintains the dissolver chamber in a pressurised state (approximately 2.5 atmospheres absolute). This assembly 32 is shown in more detail in FIG. 7. It comprises two pipe flange portions 102 and 104 and an orifice plate 106 wedged there between, as is well known in the art. In the embodiment shown, the orifice plate includes an aperture 108 whose diameter will depend on various other system parameters. In the embodiment shown, the diameter is approximately 3.25 mm diameter corresponding with a dissolver nozzle diameter of 10 mm. The skilled addressee would realise that the drop in pipe diameter creates the required back pressure in the dissolver.

Turning now to the way in which scum 74 as well as treated effluent is discharged, the reader's attention is drawn once again to FIG. 2. The DAF chamber 28 includes a scum discharge pipe 110 at the top of the chamber 28 and, although not shown, this pipe 110 leads to the black water collection tank (not shown). Conventional methods of removing scum from the top of a DAF chamber involve the use of skimmers. The present invention however works on the principle of increasing the water level in the DAF chamber so that the scum layer flows out of the chamber through discharge pipe 110. There is also a weir arrangement 112 at the top of the chamber for facilitating the flow of scum through discharge pipe 110 whilst maintaining clean water inside the chamber. This process will now be described in more detail.

The chlorinator 34 includes a chamber which houses chlorine tablets (not shown), and treated water from the bottom of the DAF chamber 28 is made to trickle into the chlorinator inlet 114, via outlet 115 of the DAF chamber, over the tablets to disinfect the water prior to discharge. The valve 116 at the chlorinator exit 118 is normally open for this reason. The pipe into the chlorinator 34 needs to be vented and so includes a riser pipe 119.

The pressure in the headspace 90 of the DAF chamber 28, as well as in the chlorinator 34, is atmospheric. Thus, the water level in the DAF chamber 28 is governed by the height of the horizontal pipe portion 120 into the chlorinator 34. The height of this pipe 120 is made at the same level or lower than the height of the scum discharge pipe 110 in the DAF chamber so in order for scum 74 to be discharged, the water level in the DAF chamber needs to be somehow raised. The skilled addressee would realise that pumping water into the DAF chamber 28 will not raise the level, it will simply cause more treated effluent to be discharged via the chlorinator 34.

One mechanism for causing the level of water in the DAF chamber to rise is through use of an automatic valve 122 on the effluent line before the chlorinator 34. Those skilled in the art will appreciate that when this valve 122 is shut and water continues to be pumped into the DAF chamber 28, the level of water in the DAF chamber 28 will rise because it can no longer flow into chlorinator 34. Thus, at the start of a treatment cycle, the automatic valve 122 can be shut and a delay timer initiated to open the valve 122 after a set period of time to allow effluent to discharge. In this embodiment, a variable 15-second delay timer is used. In having the valve closed for a period of time, the water level in the DAF chamber rises and the scum 74 is also discharged through pipe 110. Then, when the valve 122 opens again, the water level in the DAF chamber 28 will slowly lower as effluent flows into the chlorinator 34, until the original water level is reached again.

In a further embodiment, the system 10 includes a second mechanism for displacing DAF chamber waste float material. This requires the portion of pipe 120 into the chlorination chamber 34 to be positioned so the water level in the DAF chamber 28 is just below the weir level. As mentioned earlier, the dissolver 30 operates at a pressure of around 2.5 atmospheres absolute. Thus, when the pump 76 turns off after completion of a cycle, the pressure inside the dissolver 30 drops back to atmospheric. The air in the headspace 90 of the dissolver therefore expands some 3.5 times, pushing the water level in the dissolver downwards. In doing so, the water level in the DAF chamber 28 rises and in the process, a further amount of float material is displaced.

The weir arrangement 112 also includes a first member 124 positioned adjacent to the lower mouth of the discharge pipe 110 and extends diagonally upwardly therefrom towards the centre of the chamber 28. It is the upper internal edge of the first member which defines the level which float material needs to reach before being able to be discharged through pipe 110. The weir arrangement 112 further includes a second member 126 radially opposed to the first member 124 and discharge pipe 110. The second member 126 includes a surface extending diagonally upwardly to a position above the first member to thereby direct rising float material 74 onto the first member 124 and towards discharge pipe 110.

Figure 5B:
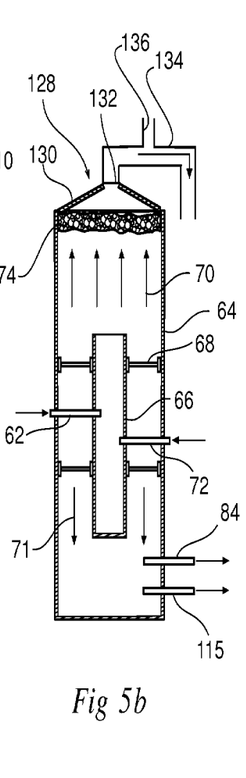
FIG. 5b illustrates a cross-sectional view of a square cross section dissolved air flotation chamber including a float removal means according to a second and preferred embodiment of the invention.

It is to be understood that the weir arrangement 112 is but one way of facilitating the removal of float material. FIG. 5b illustrates a preferred embodiment for achieving this. There is shown a chamber 128 (preferably square in cross section) including a pyramid-shaped lid 130 which terminates at its apex into an aperture 132. Discharge pipework 134 including a vent pipe 136 (for avoiding air locks) extends up from the aperture 132 and to the side of the chamber 128 as shown. Float material discharge works on the same principle as previously described in that the water level in the DAF chamber 128 is governed by the height of the horizontal pipe portion 120 into the chlorinator 34. The height of the pipe 120 is made at the same level or lower than the height of the scum discharge pipe 134 in the DAF chamber so in order for scum 74 to be discharged, the water level in the DAF chamber needs to be raised. The way in which the level can be raised is previously discussed.

The advantage over the embodiment of FIG. 5a is that all the scum material is pushed off the top by the rising water. Using the weir arrangement 112, there is a possibility that scum will stick and cause water to flow under the scum and over the weir, without necessarily pushing all the scum off the top.

A treatment cycle could be initiated in any number of ways. For example, the system could be set to perform a predetermined number of times per day depending on the daily flow of grey water into the collection tank. As a precautionary measure, the system could be made to perform a treatment cycle whenever the high level sensor 48 in the grey water collection tank 20 is triggered over and above the set amount of treatments per day. Likewise, the system could be made to switch off when the low level sensor 48 is triggered. In an alternate embodiment, the system could be triggered only when the high level sensor 48 in the collection tank 20 detects a sufficient amount of grey water. This versatility provides major advantages over alternative treatment systems which for example may require mixing and aerating, and hence consumption of power supply, over 24 hours per day.

Although not shown, the system 10 will include a suitable control means for controlling the operation of each of pumps 52, 58, and 76, the automatic valve 122, the compressed air control valve 98, for receiving and processing information from the high and low level sensors 48 and 50 in the grey water collection tank 20, and also the high level switch in the dissolver 30 of the preferred embodiment.

The following scenario is provided as an example of how the system 10 of the present invention may be applied. For a houseboat accommodating around 12 people, it is estimated that some 1800 liters of grey water may be produced per day. Say the DAF float volume resulting from this is around 30 liters per day. There will preferably be 10 treatment cycles performed throughout the day, so 3 liters of float are removed per cycle. To achieve this (when the float concentration is 18,000 mg/liter), the automatic valve shut period needs to be set to around 16.4 seconds. For a DAF chamber diameter of 300 mm, this will cause a rise of the water level in the DAF chamber 28 of 42.5 mm, however, other DAF chamber diameters could be used and this will obviously affect the rise distance. As mentioned, the present invention is not intended to be limited to any one particular configuration.

These results are based on using a pump feed rate of 11 liters/minute, a dissolver inlet nozzle size of 10 mm, an orifice plate aperture size of 3.25 mm, a coagulant feed rate of 0.52 liters/hour, and a compressed air feed rate of 0.123 liters/min.

The person skilled in the art would now appreciate the various advantages of the system 10 of the present invention. The system 10 provides a very compact means of treating grey water, and is therefore suitable for use in vehicles such as house boats where storage capacity for grey water is limited. The opportunity for treatment of grey water prior to overboard discharge eliminates the need for substantial grey water holding capacity, and addresses many of the environmental concerns mentioned in the preamble of the invention. The system is also useful because it reduces weight requirements on house boats and operates using low power, low cost and low noise, unlike more traditional biological systems. As mentioned, it only needs to operate when the grey water is generated.

The frame which supports the system 10 could even be made to include lifting means such as forklift tyne receiving channels at the base, to enable it to be easily transported and fitted to an existing house boat.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

In any claims that follow and in the summary of the invention, except where the context requires otherwise due to express language or necessary implication, the word "comprising" is used in the sense of "including", i.e. the features specified may be associated with further features in various embodiments of the invention.

The invention claimed is:

1. A compact dissolved air flotation facility for treating water or wastewater, said facility characterised by:
   a water or wastewater collection tank;
   a pressurized flocculation chamber;
   a dissolved air flotation (DAF) chamber including a submerged contact chamber for directing water entering the chamber to a surface thereof;
   a means of pumping, under pressure, water or wastewater out from the water or wastewater collection tank into the submerged contact chamber via the pressurised flocculation chamber, water entering the DAF chamber having undergone flocculation including suspended matter;
   an external pressurised dissolver associated with the DAF chamber, said dissolver adapted to saturate water with air and including an orifice plate assembly at an outlet of the dissolver to create a back pressure in the dissolver;
   a means of recirculating water out from the DAF chamber and then back into the DAF chamber via said pressurised dissolver, whereby air-saturated water from the dissolver degasses upon entry into the DAF chamber and forms bubbles which adhere to said suspended matter causing it to float to the surface to form a layer of float material;
   a means of discharging said float material from an upper portion of the DAF chamber in the form of an upper discharge line such that float material is discharged through said upper discharge line when a water level inside the DAF chamber exceeds that of the upper discharge line;
   chlorination chamber including an inlet which defines the water level in said DAF chamber below the upper discharge line, configured such that treated water from the DAF chamber flows through a lower discharge line of the DAF chamber up to the chlorination chamber inlet; and
   a valve associated with the lower discharge line and operable between a closed position to prevent flow through said lower discharge line and an open position to allow flow through, said valve adapted to be closed for a predetermined period of time during a treatment cycle to thereby cause said water level in the DAF chamber to rise and for said float material to be discharged through the upper discharge line.

2. A dissolved air flotation facility as characterised in claim 1 wherein said contact chamber includes a base, a side wall, an inlet for said air-saturated water and an inlet for flocculated water which includes suspended matter, said base and side walls being configured to concentrate interaction between the air-saturated water and suspended matter inside the DAF chamber.

3. A dissolved air flotation facility as characterised in claim 1 wherein said flocculation chamber includes:
   an inlet pipe for said water;
   a means of introducing coagulant to said water flowing through said inlet pipe prior to entry into said chamber;
   an outlet pipe for said water; and
   a length of pipe between said inlet and outlet pipes including a series of adjacent, upward and downward extensions inside said chamber in a long intestine-type arrangement, to thereby facilitate flocculation of said water prior to reaching the outlet pipe.

4. A dissolved air flotation facility as characterised in claim 1 wherein said flocculation chamber includes a coil through which water is adapted to pass between the collection tank and the DAF chamber, said coil including a means of introducing coagulant to said water flowing through the coil.

5. A dissolved air flotation facility as characterised in claim 1, wherein a change in pressure which occurs in the dissolver headspace during each treatment cycle causes said water level in the dissolved air flotation chamber to rise a second time to thereby displace a further amount of float material.

6. A water or wastewater treatment system characterised by:
   a pressurized flocculation chamber;
   a dissolved air flotation chamber including an internal, submerged contact chamber for directing water or wastewater entering the contact chamber to the surface of the dissolved air flotation chamber, said dissolved air flotation chamber including a float discharge pipe;
   a pump adapted to pump said water or wastewater under pressure into the contact chamber via the pressurised flocculation chamber, water entering the contact chamber from the flocculation chamber including suspended matter;
   an external pressurised dissolver for saturating water with air, said dissolver including an orifice plate assembly at its outlet to create a back pressure in the dissolver;
   a pump adapted to recirculate treated water out from the dissolved air flotation chamber and into the contact chamber via said external pressurised dissolver, whereby air-saturated water from the dissolver degasses upon entry into the contact chamber and forms bubbles which adhere to said suspended matter causing it to float to the surface of the dissolved air flotation chamber to form a layer of float material;
   a chlorination chamber including an inlet which defines a water level in said dissolved air flotation chamber at a level below said float discharge pipe, and configured such that treated water inside said dissolved air flotation chamber flows through a lower discharge line up to the inlet of said chlorination chamber; and
   a valve in said lower discharge line adapted to prevent flow of water from the dissolved air flotation chamber to the chlorination chamber inlet for a predetermined amount of time to thereby cause said water level in the dissolved air flotation chamber to rise and said float material to be discharged through said float discharge pipe.

7. A system as characterised in claim 6 wherein said system is configured to be retro-fitted to a houseboat so that grey water from kitchen sinks, laundries and the like is fed into said contact chamber via the pressurised flocculation chamber.

8. A system as characterised in claim 6 wherein said valve is an automatic valve including a delay timer which enables the valve to automatically open after said predetermined amount of time.

9. A water treatment system as characterised in claim 6, wherein a change in pressure which occurs in the dissolver headspace during each treatment cycle causes said water level in the dissolved air flotation chamber to rise a second time to thereby displace a further amount of float material.

10. A water treatment system as characterised in claim 6, wherein the dissolved air flotation chamber includes walls at an upper portion thereof which terminate in an apex shape and wherein said float discharge pipe is a pipe extending outwardly from a substantially vertical pipe rising above said apex through which float, material is directed when the water level in the chamber rises.

11. A treatment cycle for water or wastewater, said treatment cycle characterised by:

flocculating water or wastewater to be treated;

pumping, under pressure, flocculated water including contaminants to a contact chamber submerged inside a dissolved air flotation chamber and configured to direct water or wastewater to a surface of the chamber, said dissolved air flotation chamber further including treated water;

circulating said treated water to an external pressurised dissolver and associated orifice plate assembly downstream of the dissolver for causing a back pressure in said dissolver, and back into the dissolved air flotation chamber, thereby feeding said chamber with air-saturated water from the dissolver which causes said contaminants to float towards a top surface of water in the dissolved air flotation chamber, thereby forming a layer of float material, the chamber including a minimum discharge level above the top surface of water defining a height at which rising float material will exit said chamber;

discharging, via a discharge line of said chamber, treated water from which said contaminants have been substantially removed, whereby treated water inside the dissolved air flotation chamber flows through the discharge line up to an inlet of an chlorination chamber, whereby a height of the chlorination chamber inlet defines a water level in said chamber, said height being below the minimum discharge level;

discharging said float material by providing an automatic valve along said discharge line configured to automatically close said flow to the chlorination chamber inlet for a period of time during said cycle and thereby cause the water level in the chamber to rise above said minimum discharge level, and automatically open after a predetermined float material discharge period.

12. A water treatment system characterised by:

a grey water collection tank;

a flocculation chamber;

a dissolved air flotation chamber including au internal, submerged contact chamber for directing water entering the contact chamber to the surface of the dissolved air flotation chamber, said dissolved air flotation chamber including a discharge pipe;

a pump adapted to pump grey water out from the grey water collection tank into the contact chamber via the flocculation chamber, water entering the contact chamber from the flocculation chamber including suspended matter;

a pressurised dissolver for saturating water with air;

an orifice plate assembly associated with an outlet of said dissolver, said orifice plate assembly adapted to create a back pressure in said dissolver;

a pump adapted to pump water out from the dissolved air flotation chamber and into the contact chamber via said dissolver and orifice plate assembly, whereby air-saturated water degasses upon entry into the contact chamber and forms bubbles which adhere to said suspended matter causing it to float to the surface of the dissolved air flotation chamber to form a layer of float material;

a chlorination chamber configured such that water inside said dissolved air flotation chamber flows through a discharge line to an inlet of said chlorination chamber, whereby the height of said inlet defines a water level in said dissolved air flotation chamber, said water level disposed below the discharge pipe; and a valve in said discharge line adapted to prevent flow of water from the dissolved air flotation chamber to the chlorination chamber for a predetermined amount of time to thereby cause said water level to rise and said float material to be discharged through said discharge pipe.

* * * * *